US009742877B2

(12) United States Patent
Cruz-Aguilar et al.

(10) Patent No.: US 9,742,877 B2
(45) Date of Patent: Aug. 22, 2017

(54) CLUSTERING SUPPORT ACROSS GEOGRAPHICAL BOUNDARIES

(71) Applicant: International Business Machines Corporation, Armonk, NY (US)

(72) Inventors: Esdras E. Cruz-Aguilar, Austin, TX (US); Perinkulam I. Ganesh, Round Rock, TX (US); Madhusudanan Kandasamy, Gobichettipalayam (IN); Christine J. Wu, Verona, WI (US)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 13/692,803

(22) Filed: Dec. 4, 2012

(65) Prior Publication Data
US 2014/0156861 A1 Jun. 5, 2014

(51) Int. Cl.
G06F 15/16 (2006.01)
H04L 29/06 (2006.01)
H04L 29/08 (2006.01)
G06F 15/173 (2006.01)

(52) U.S. Cl.
CPC .......... H04L 69/16 (2013.01); H04L 67/1002 (2013.01)

(58) Field of Classification Search
CPC ............... H04L 29/06; H04L 29/08072; H04L 29/06095
USPC .......................................................... 709/230
See application file for complete search history.

(56) References Cited

U.S. PATENT DOCUMENTS

| 6,192,417 | B1 | 2/2001 | Block et al. ................... 709/249 |
| 6,829,662 | B2 | 12/2004 | King-Smith et al. ........... 710/56 |
| 7,280,540 | B2 | 10/2007 | Halme et al. ................. 370/392 |
| 7,451,359 | B1 | 11/2008 | Coekaerts ....................... 714/48 |
| 7,451,456 | B2 | 11/2008 | Andjelic ....................... 719/321 |
| 7,526,549 | B2 | 4/2009 | Block et al. .................. 709/225 |

(Continued)

FOREIGN PATENT DOCUMENTS

| CN | 101409669 | 4/2009 |
| CN | 102075434 | 5/2011 |

OTHER PUBLICATIONS

Sumimoto et al., "High Performance Communication using a Commodity Network for Cluster Systems," Proceedings of the Ninth International Symposium on High-Performance Distributed Computing, Aug. 2000, Pittsburgh, PA, pp. 139-146.

(Continued)

*Primary Examiner* — Alan S Chou
(74) *Attorney, Agent, or Firm* — VanLeeuwen & VanLeeuwen; Thomas E. Tyson (57) ABSTRACT

An approach is presented that provides computer clustering support across geographical boundaries. Inter-node communications are managed in a cluster by having each node operate at the network device driver (NDD) level within the kernel. Multiple types of NDD are utilized (Ethernet, SAN, DISK etc.) to provide redundancy so that nodes can reliably exchange heartbeat. To align with this architecture, for remote nodes, a pseudo NDD is used over Transmission Control Protocol (TCP) based communication interface to work along side other NDDs. Thus, the same packet which is sprayed over the NDDs pertaining to local nodes can be sprayed over the TCPSOCK NDD interface for remote nodes. Nodes (local or remote) receive the same packet and reassemble and process it in the same manner.

14 Claims, 8 Drawing Sheets

(56) References Cited

U.S. PATENT DOCUMENTS

| | | | |
|---|---|---|---|
| 7,631,100 B2 | 12/2009 | Ben-Zvi et al. | 709/245 |
| 8,130,747 B2 | 3/2012 | Li et al. | 370/351 |
| 8,660,129 B1* | 2/2014 | Brendel | H04L 12/4641 370/397 |
| 2003/0023601 A1* | 1/2003 | Fortier, Jr. | G06F 17/30569 |
| 2003/0061399 A1* | 3/2003 | Wagener | G06F 3/0601 719/321 |
| 2005/0021751 A1* | 1/2005 | Block | G06F 9/54 709/225 |
| 2009/0083756 A1 | 3/2009 | Kim et al. | 719/312 |
| 2009/0083767 A1 | 3/2009 | Lee et al. | 719/321 |
| 2012/0005369 A1 | 1/2012 | Capone et al. | 709/236 |

OTHER PUBLICATIONS

IBM, "VLAN performance improvement using pre-inserted tags and bypassing VLAN device driver," International Business Machines Corporation, ip.com, IPCOM000158182D, Sep. 2007, 5 pages.

* cited by examiner

CLUSTERING SUPPORT ACROSS GEOGRAPHICAL BOUNDARIES

TECHNICAL FIELD

The present disclosure relates to an approach that provides enhancements to computer system clusters that include systems in various geographic locations, or sites.

BACKGROUND OF THE INVENTION

A cluster is a group of independent computers working together that give an illusion of a single system image. Clusters are often used to ensure that mission critical applications and resources are highly available. To provide an efficient cluster solution many vendors offer operating systems (OS) that are "cluster aware." Most, if not all, cluster communications in these solutions are point-to-multipoint. Events, such as the death or hang of a critical process, on one node of the cluster are conveyed quickly and directly to all other nodes in the cluster. State and health information on one node is also shared between all nodes of the cluster. These activities naturally lead to a multicast architecture for cluster network communication. Consequently, many existing cluster products employ multicast approaches. Typically in such an architecture a centralized repository disk is used to define the cluster configuration data. The centralized repository disk needs to be accessible on all the nodes in the cluster. In one approach, a solution is provided that uses the multicast architecture, however this solution does not scale to include nodes located at different sites that are separated by geographical boundaries. First, this approach does not scale due to communication links spanning large distances. For multicast communication to work, each link from end to end must supports multicast forwarding, supports the desired multicast group, and supports the desired port. If any one of these conditions is not satisfied, the multicast communication will be broken, which occurs due to the fact that telecommunication companies typically do not support multicast forwarding over such distances. Second, this approach does not scale due to the nature of multicast. More particularly, multicast, where one-to-many communication is used, requires the use of the user datagram protocol (UDP). However, because the UDP does not have built-in reliability, inter-site communication is compromised.

SUMMARY

An approach is presented that provides computer clustering support across geographical boundaries. Inter-node communications are managed in a cluster by having each node operate at the network device driver (NDD) level within the kernel. Multiple types of NDD are utilized (Ethernet, SAN, DISK etc.) to provide redundancy so that nodes can reliably exchange heartbeat. To align with this architecture, for remote nodes, a pseudo NDD is used over Transmission Control Protocol (TCP) based communication interface to work along side other NDDs. Thus, the same packet which is sprayed over the NDDs pertaining to local nodes can be sprayed over the TCPSOCK NDD interface for remote nodes. Nodes (local or remote) receive the same packet and reassemble and process it in the same manner.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
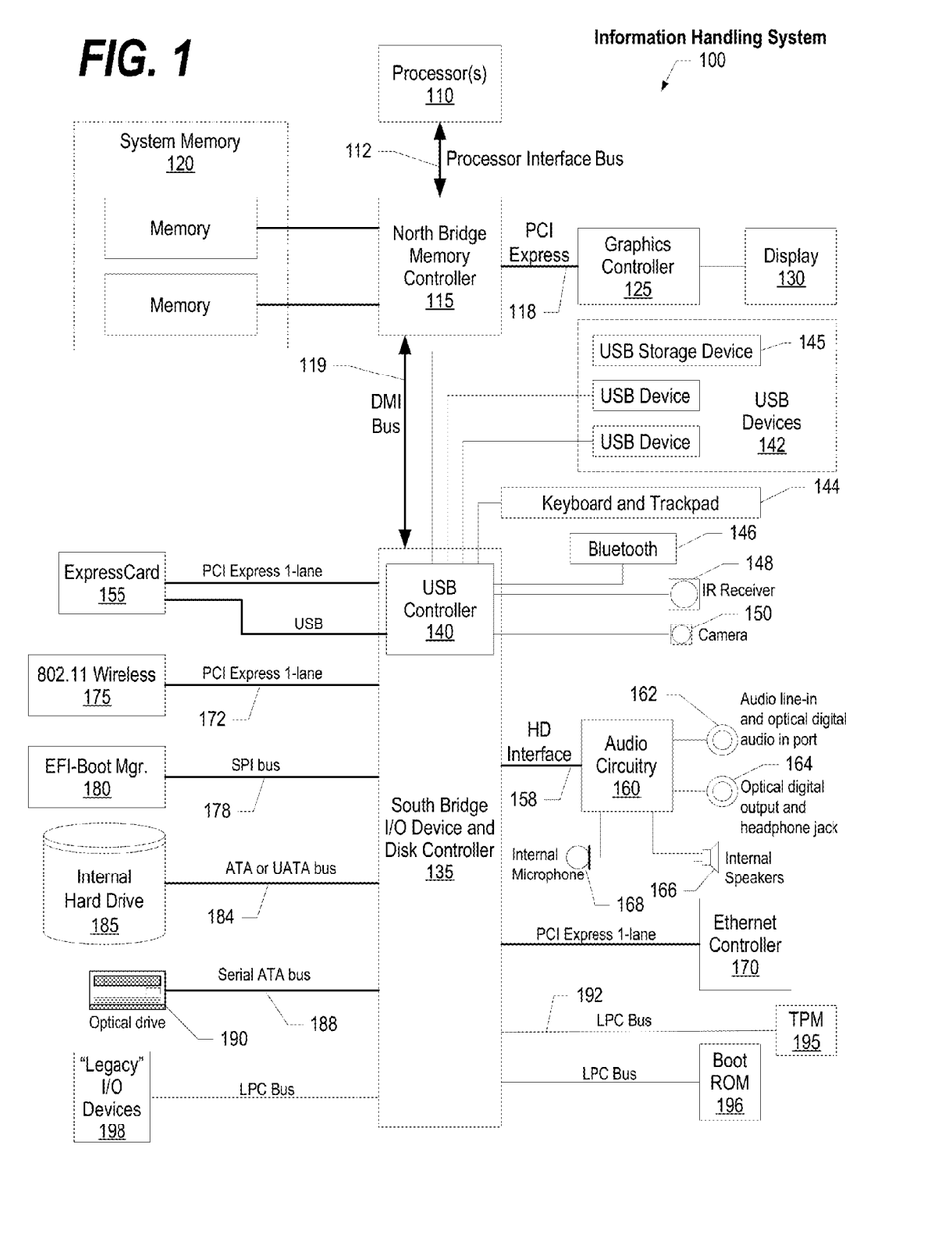
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
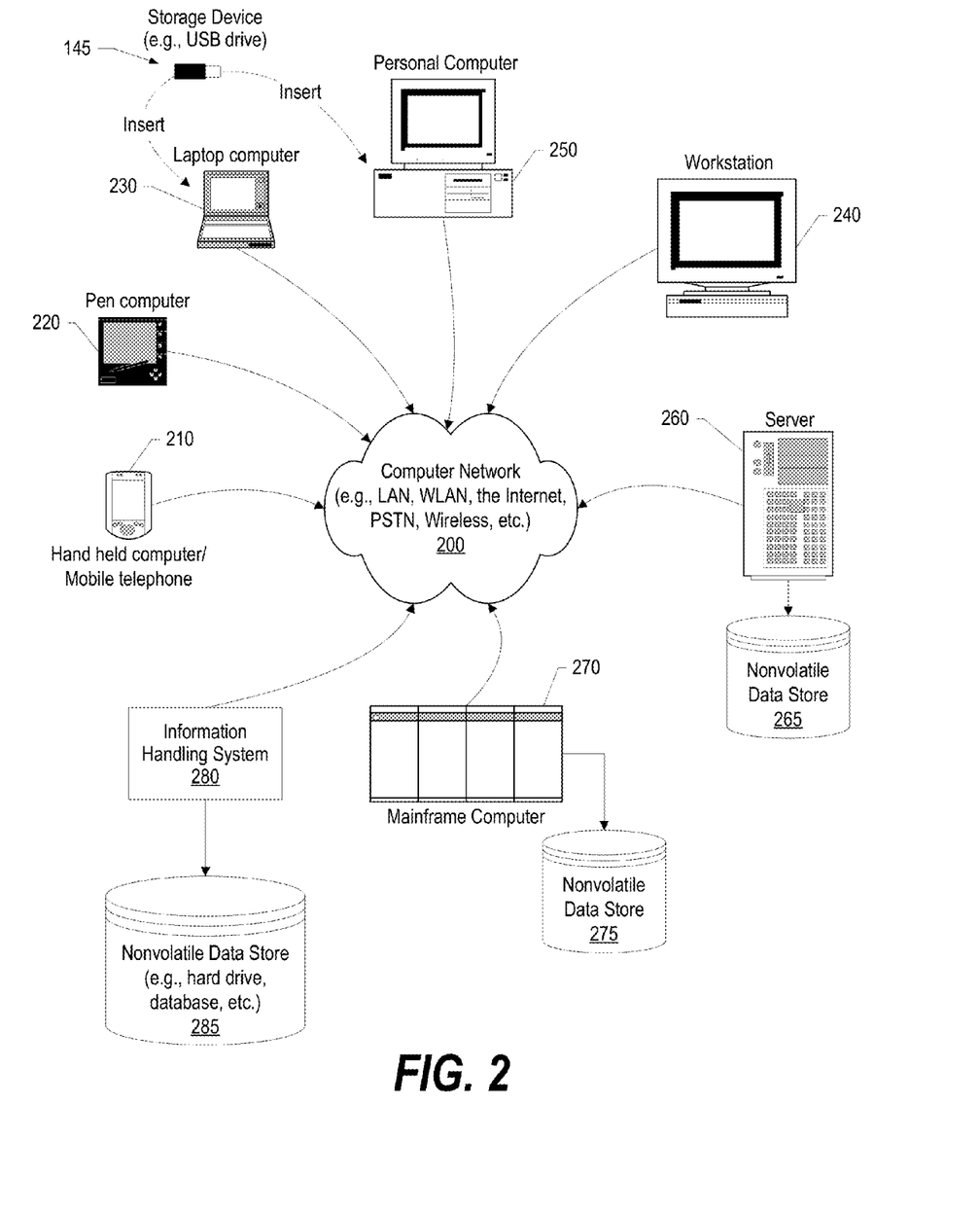
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-8 depict an approach that provides computer clustering support across geographical boundaries and that can be executed on an information handling system and network as shown in FIGS. 1-2. In this approach, a cluster communication layer providers cluster communication services and resides above the device driver layer. Utilizing device drivers created when the node is initialized, this approach extends the architecture to introduce a TCP socket-based kernel pseudo NDD (network device driver) interface where the underlying means of communication is abstracted from the TCP layer to handle communications between sites. When packets are sent from the node to other nodes, the TCPSOCK NDDs are configured to send the packets using TCP when the receiving node is remote and utilizes existing interfaces, such as Ethernet, SAN or DISK, when the receiving node is local. In this manner, the sending process (at the cluster communication layer) need not be aware of whether the receiving node is remote or local. Inter-node communications are managed in a cluster by having each node operate at the network device driver (NDD) level within the kernel. Multiple types of NDD are utilized (Ethernet, SAN, DISK etc.) to provide redundancy so that nodes can reliably exchange heartbeat. Further communication redundancy is maintained at data fragmentation level. This ensures on the arrival nodes packets can be assembled irrespective of through which NDD they surface up. To align with this architecture, for remote nodes, a pseudo NDD was implemented over Transmission Control Protocol (TCP) based communication interface to work along side with other NDDs. Thus the same packet which is sprayed over the NDDs pertaining to local nodes can be sprayed over the TCPSOCK NDD interface for remote nodes. All nodes (local or remote) receive the same packet and reassemble and process it in identical manner.

Figure 3:
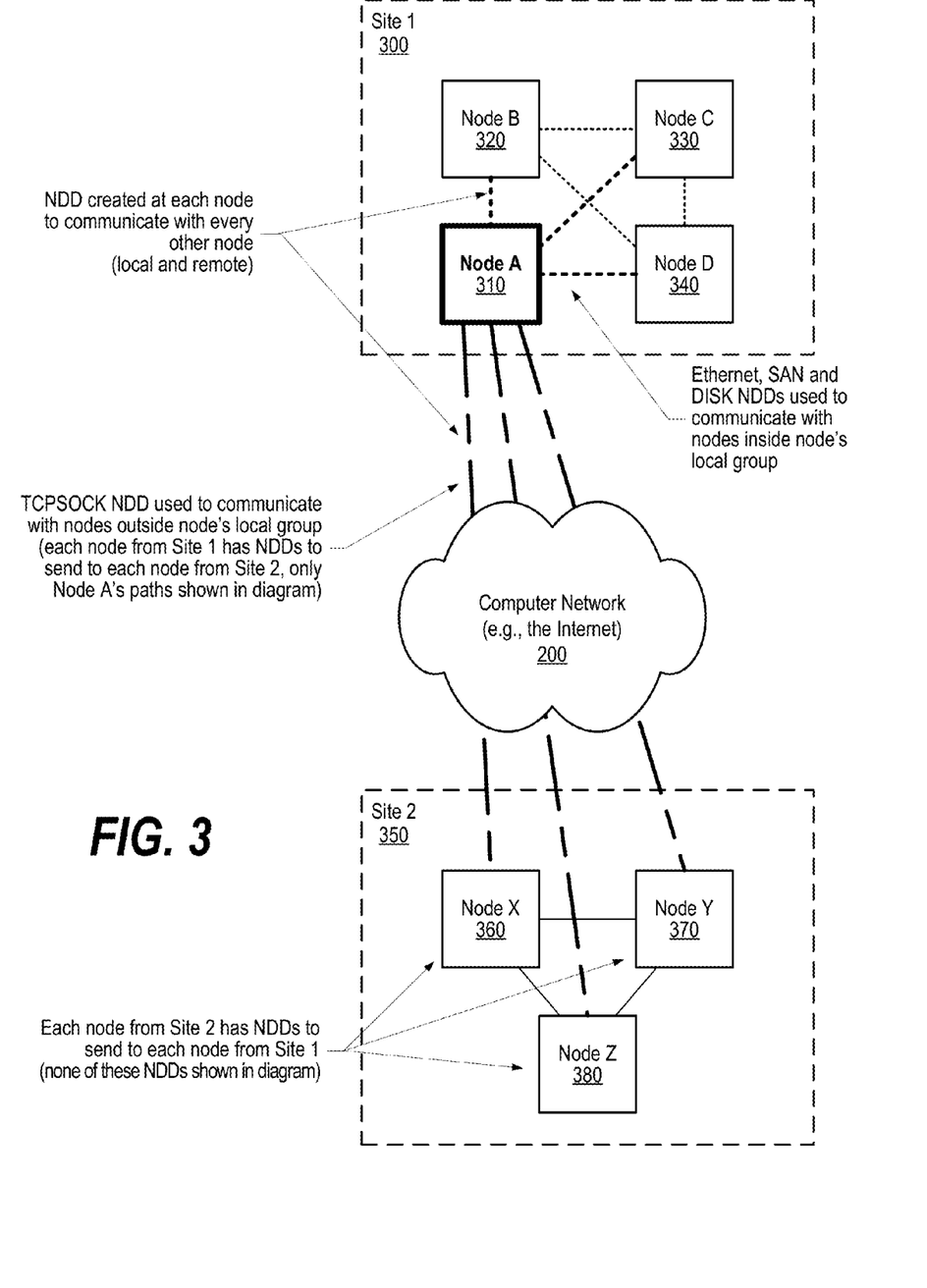
FIG. 3 is a component diagram depicting communication between the various components utilized in supporting clustering across geographical boundaries.

FIG. 3 is a component diagram depicting communication between the various components utilized in supporting clustering across geographical boundaries. In the example shown in FIG. 3, a cluster includes computer systems from two different geographic sites—Site 1 (300) and Site 2 (350). Site 1 is shown having four systems (nodes) that are local to each other. Site 1 nodes include Node A (310), Node B (320), Node C (330), and Node D (340). Likewise, Site 2 is shown having three systems (nodes that are local to each other. Site 2 nodes include Node X (360), Node Y (370), and Node Z (380). As explained in further detail herein, a network device driver (NDD) is created by each of the nodes to communicate with each of the other nodes. In the case of local nodes, an existing interface, such as Ethernet, SAN or DISK to transmit UDP (user datagram protocol) multicast, is utilized. The UDP multicast is transmitted as multiple frames if the UDP multicast exceeds the size of an Ethernet packet. However, in the case of remote nodes, a pseudo-TCP based NDD interface is created to send the same frames to the remote nodes.

Looking at Node A (310), as shown this node has NDDs to send packets to each of local Nodes B, C, and D using an existing interface, such as Ethernet, SAN and DISK. In addition, a pseudo-TCPSOCK NDD is used to send packets from Node A to remote Nodes X, Y, and Z. Likewise, Nodes B, C, and D will each have NDDs that utilize the existing interface to send packets to each of the other local Nodes (in Site 1) and Nodes B, C, and D will each create NDDs using the pseudo-TCP interface described herein to send packets to remote Nodes X, Y, and Z.

Turning to Site 2, the same technique is used to communicate with local and remote Nodes. Each of the Nodes at Site 2 (Nodes X, Y, and Z) will have NDDs utilizing an existing interface to send packets to the other Nodes at Site 2. Likewise, each of the Site 2 Nodes will create NDDs using the pseudo-TCPSOCK NDD interface described herein to send packets to remote Nodes A, B. C, and D at Site 1. In this manner, a process need not be aware of whether a receiving node is local or remote. Instead, the process utilizes the created NDDs and the packet is transmitted using the desired interface based on whether the receiving node is a local or remote node.

Figure 4:
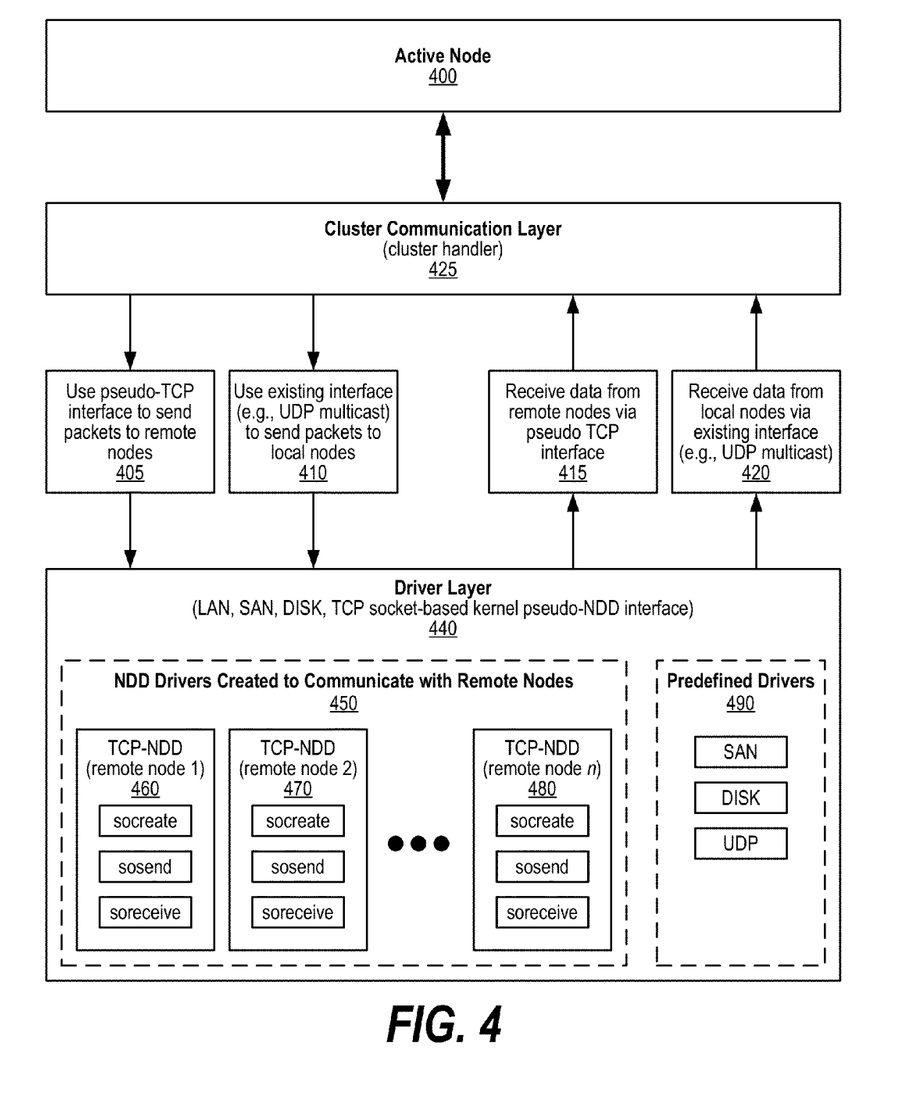
FIG. 4 is a layer diagram depicting various layers used by a node when communicating to other nodes in a cluster.

FIG. 4 is a layer diagram depicting various layers used by a node when communicating to other nodes in a cluster. Each Node depicted in FIG. 3 can utilize the layered approach provided in FIG. 4 to abstract the type of communication (local or remote) from processes running on the node. Active Node 400 (e.g., any of the Nodes depicted in FIG. 3, etc.) is shown sending and receiving packets to other nodes in the cluster using various NDD interfaces. Block 405 represents packets being sent from the Active Node to remote nodes in the cluster using a pseudo-TCPSOCK NDD interface. Block 410 represents packets being sent from the Active Node to local nodes in the cluster using an existing interface, such as user datagram protocol (UDP) multicast. Likewise, block 415 represents the Active Node receiving packets from remote nodes via the pseudo-TCPSOCK NDD interface, and block 420 represents the Active Node receiving packets from local nodes using the existing NDD interfaces.

Each node is shown including Cluster Communication Layer 425 which handles communications with the other nodes in the cluster. In essence, the Cluster Communication Layer has processes that sends and receives packets from other nodes (blocks 405 through 420). However, instead of having to understand which nodes are local and which are remote, the Cluster Communication Layer utilizes Driver Layer 440 which abstracts the geographical proximity of the various nodes by providing network device drivers (NDDs) 450 as well as predefined drivers 490. In this manner, the means by which packets are sent and received from the various nodes in the cluster is abstracted from the Cluster Communication Layer.

Turning now to the Driver Layer, when the Active Node is initialized, pseudo TCPSOCK NDD drivers 450 are created to communicate with each of the remote nodes. In addition, an existing interface is used as a driver to communicate with each of the local nodes (e.g., using UDP multicast from predefined drivers 490, etc.). As shown, NDDs used to communicate with remote nodes (450) include a separate NDD corresponding to each of the remote nodes in the cluster. In the example shown, Active Node 400 communicates with remote node 1 using NDD 460, with remote node 2 using NDD 470 through remote node n using NDD 480. Also, as shown, each of the created NDDs provide an NDD interface that can utilize internally the kernel APIs for socket based communication to communicate with the node (e.g., create (socreate), send (sosend), receive (soreceive), etc.).

Figure 5:
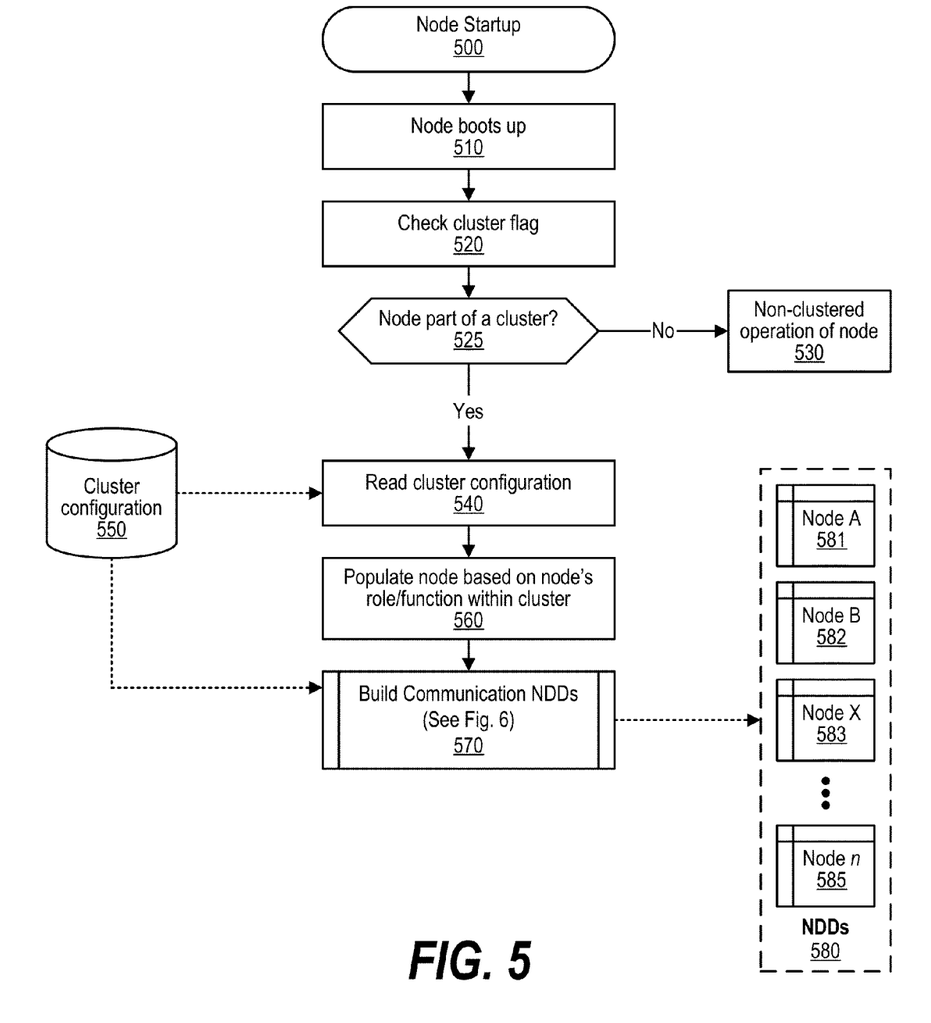
FIG. 5 is a depiction of a flowchart showing the logic performed by a node during startup operations to support clustering across geographical boundaries.

FIG. 5 is a depiction of a flowchart showing the logic performed by a node during startup operations to support clustering across geographical boundaries. Processing commences at 500 whereupon, at step 510 the node boots up (e.g., initialized, warm boot, cold boot, etc.). At step 520, the initialization process checks a cluster flag that indicates whether the node that is being initialized is part of a cluster. A decision is made as to whether the node is a member of a cluster (decision 525). If the node is not a member of a cluster, then decision 525 branches to the "no" branch whereupon, at step 530, the node continues initialization and operation as a non-clustered system (node). On the other hand, if the node is a member of a cluster, then decision 525 branches to the "yes" branch for further cluster initialization.

At step 540, cluster configuration data is read from cluster configuration data store 550. The cluster configuration data includes data regarding both the local and remote nodes that are included in the cluster. In addition, the cluster configuration data can include role information that identifies the function, or role, that this node plays in the cluster (e.g., primary responsibilities, backup responsibilities, etc.). At step 560, the node is populated (e.g., initialized, etc.) based on the node's role or function within the cluster. At predefined process 570, the process builds communication network device drivers (NDDs) used to communicate with the remote nodes in the cluster (see FIG. 6 and corresponding text for processing details). The result of running predefined process 570 is a set of drivers (NDDs 580) used to communicate with other nodes in the cluster. In the example shown, Node A corresponds to NDD 581, Node B corresponds to NDD 582, Node X corresponds to NDD 583, through Node n which corresponds to NDD 585. A node utilizes existing set of Ethernet, SAN and DISK NDD to communicate to all of the local nodes, but a unique pseudo TCPSOCK NDD interface for each remote node.

Figure 6:
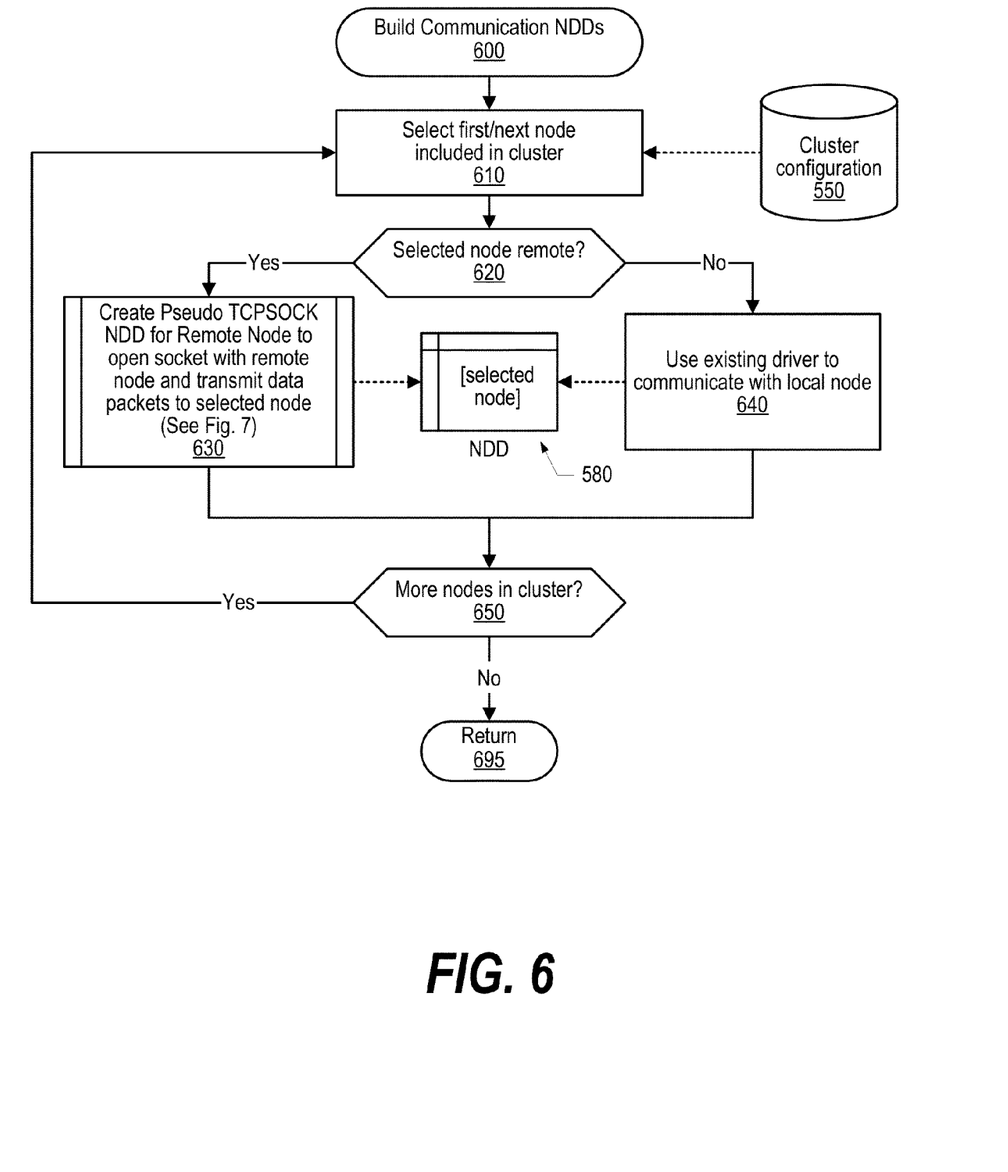
FIG. 6 is a depiction of a flowchart showing the logic performed at the node to build communication network device drivers used when communicating with other nodes in the cluster.

FIG. 6 is a depiction of a flowchart showing the logic performed at the node to build communication network device drivers used when communicating with other nodes in the cluster. Processing commences at 600 whereupon, at step 610, the first node that is a member of the cluster is selected from cluster configuration data store 550. A decision is made as to whether the selected node is a remote node (decision 620). If the selected node is a remote node, then decision 620 branches to the "yes" branch whereupon, at predefined process 630, a pseudo TCPSOCK NDD is created that corresponds to the remote node to open a socket with remote node and transmit data packets to selected node using TCP (see FIG. 7 and corresponding text for processing details). The created NDD is stored in NDD (Driver Layer) 580. On the other hand, if the selected node is a local node, then decision 620 branches to the "no" branch whereupon, at step 640, an existing driver (e.g., for Ethernet, SAN or DISK, etc.) is selected and used to communicate with the local node and this driver information is stored in driver layer 580.

After the selected node has been processed and a NDD has been created to communicate with the selected node, a decision is made as to whether there are additional nodes in the cluster (decision 650). If there are additional nodes, then decision 650 branches to the "yes" branch which loops back to select and create an NDD for the next node as described above. This looping continues until a NDD has been created for all of the nodes, at which point decision 650 branches to the "no" branch whereupon processing returns to the calling routine (see FIG. 5) at 695.

Figure 7:
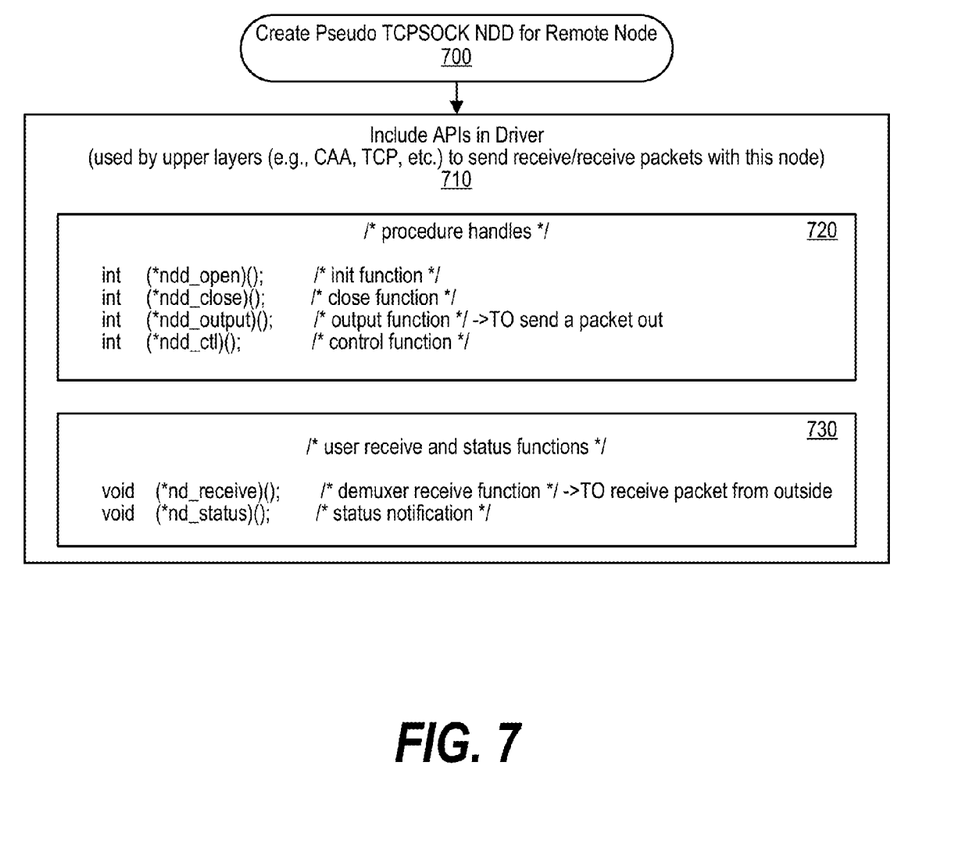
FIG. 7 is a depiction of a flowchart showing the logic performed at a node to create a pseudo TPC-based network device driver that is used to communicate with remote cluster nodes.

FIG. 7 is a depiction of a flowchart showing the logic performed at a node to create a pseudo TPC-based network device driver that is used to communicate with remote cluster nodes. At step 710, the process includes Application Programming Interfaces (APIs) in the driver that allows the driver to be used by other processes. The APIs are used by upper layers in the node (e.g., the Cluster Communication Layer, etc.) to send and receive packets with this node so that the upper layer processes need only reference the APIs without needing to determine whether the node is remote or local. The APIs included include procedure handles as well as user receive and status functions. Procedure handles 720 include functions to initialize (ndd_open), close (ndd_close), send a packet out (ndd_output), as well as control functions (ndd_ctl). User receive and status functions include functions to receive packets from other nodes (nd_receive) as well as a status notification function (nd_status).

Figure 8:
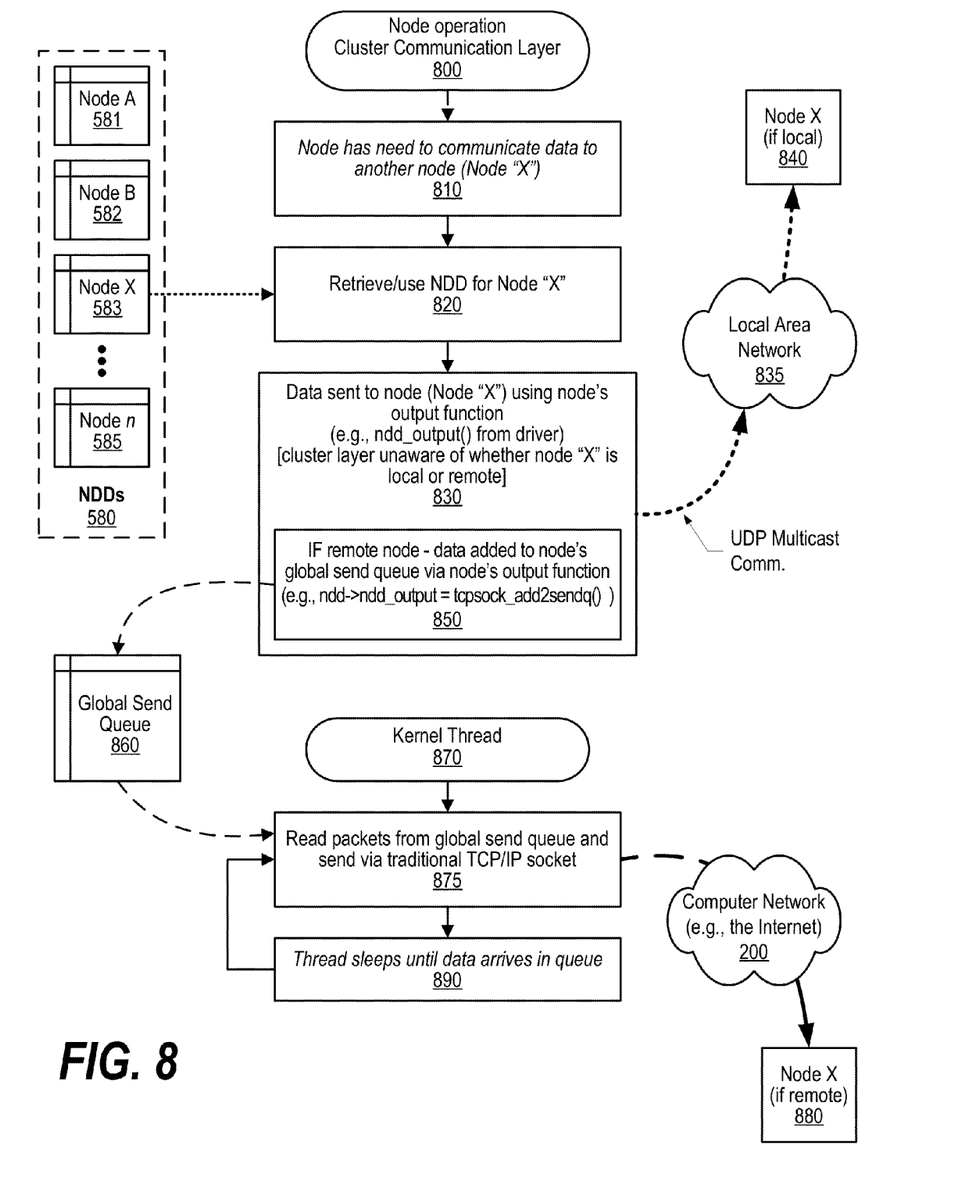
FIG. 8 is a flowchart depicting node operations at the node's cluster communications layer used when communicating with cluster nodes.

FIG. 8 is a flowchart depicting node operations at the node's cluster communications layer used when communicating with cluster nodes. Note that the processing shown in FIG. 8 takes place after the NDDs have been established and stored in the Data Layer of the active node. Processing commences at 800 whereupon, at step 810, the active node has need to communicate with another node in the cluster. In this example, the active node has a need to communicate with Node X. At step 820, the process uses the NDD that was created for Node X (e.g., to send a packet to Node X, reference is made to the send API (ndd_output) of the NDD corresponding to Node X.

At step 830, a data packet is sent from the active node to the desired node (Node X) using the NDD's output function (API). Note that the process is unaware of whether Node X is a local or a remote node. If Node X is a local node (Node X 840), then the NDD is an existing interface (e.g., UDP multicast, etc.) that sends the data packets to Node X 840 through local area network 835. On the other hand, as shown by step 850, if Node X is a remote node, then the NDD created for Node X adds the data to Global Send Queue 860 via the node's output function (e.g., ndd_output API included in the NDD corresponding to Node X). When the NDD output is called the framework calls tcpsock_ndd_add2_sendq which queues up the message in Queue 860 and wakes up the send thread. The send thread picks up the message and internally invokes sosend( ) to send the cluster messages.

There is a kernel thread running which retrieves the data from Global Send Queue 860 and sends the data via a traditional TCP/IP socket. The kernel knows the IP address to use when a connection is being established with a remote node. Once a connection is established, a socket pointer is used for subsequent communications with the remote node. This socket pointer uniquely identifies the connection and is stored internally in the TCPSOCK NDD's private data structure. There is a one to one mapping between the NDD pointer and socket pointer. In this manner, by merely calling the ndd_output routine corresponding to the desired node, the traffic is sent to the right recipient. Kernel thread processing is shown commencing at 870 whereupon, at step 875, the kernel thread read packets from Global Send Queue 860 and sends the packets via traditional TCP/IP socket as described above. Using the TCP/IP socket, the data packet is sent through computer network 200 (e.g., the Internet, etc.) to Node X 880 when the node is a remote node. At step 890, if there is no data in the Global Send Queue, then the kernel thread goes to sleep and waits for data to be queued in the Global Send Queue, at which time the kernel thread wakes up and processes the data.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a memory coupled to at least one of the processors;
   a network interface that connects the information handling system to a computer network;
   a set of instructions stored in the memory and executed by at least one of the processors to manage inter-node communications in a cluster wherein the set of instructions perform actions of:
   determining that a first set of a plurality of network device drivers operating at a network device driver level corresponds to a plurality of remote nodes and a second set of the plurality of network device drivers operating at the network device driver level corresponds to a plurality of local nodes;
   in response to determining that the first set network device drivers corresponds to the plurality of remote nodes, building the first set of network device drivers with a Transmission Control Protocol (TCP)-based interface;

in response to determining that the second set of network device drivers corresponds to the plurality of local nodes, building the second set of network device drivers with an existing interface that is a non-TCP based interface;

storing the plurality of network device drivers comprising the first set of network device drivers and the second set of network device drivers in a driver layer; and sending one or more packets to a destination node utilizing a selected one of the plurality of network device drivers in the driver layer corresponding to the destination node.

2. The information handling system of claim 1 wherein packets are sent from a cluster communication layer that does not determine whether the destination node is remote prior to the sending.

3. The information handling system of claim 1 wherein the plurality of NDDs are selected from a group consisting of a Storage Area Network (SAN) driver, a disk driver, an Ethernet driver, and a Transmission Control Protocol (TCP) based pseudo NDD driver.

4. The information handling system of claim 1 wherein the TCP based interface utilizes a socket based kernel interface and provides a pseudo NDD layer support by implementing a TCPSOCK NDD framework interface.

5. The information handling system of claim 4 wherein the TCP based interface provides TCP based handlers selected from a group consisting of initialize, allocate, free, control, send and receive.

6. The information handling system of claim 5 wherein the TCP based interface utilizes a plurality of TCP/IPs socket based kernel interfaces.

7. The information handling system of claim 4 wherein the TCP based interface seamlessly operates with other non-TCP based Network Device Driver (NDD) interfaces.

8. A computer program product stored in a non-transitory computer readable medium, comprising computer instructions that, when executed by an information handling system, causes the information handling system to perform actions comprising:

determining that a first set of a plurality of network device drivers operating at a network device driver level corresponds to a plurality of remote nodes and a second set of the plurality of network device drivers operating at the network device driver level corresponds to a plurality of local nodes;

in response to determining that the first set network device drivers corresponds to the plurality of remote nodes, building the first set of network device drivers with a Transmission Control Protocol (TCP)-based interface;

in response to determining that the second set of network device drivers corresponds to the plurality of local nodes, building the second set of network device drivers with an existing interface that is a non-TCP based interface;

storing the plurality of network device drivers comprising the first set of network device drivers and the second set of network device drivers in a driver layer; and sending one or more packets to a destination node utilizing a selected one of the plurality of network device drivers in the driver layer corresponding to the destination node.

9. The computer program product of claim 8 wherein packets are sent from a cluster communication layer that does not determine whether the destination node is remote prior to the sending.

10. The computer program product of claim 8 wherein the plurality of NDDs are selected from a group consisting of a Storage Area Network (SAN) driver, a disk driver, an Ethernet driver, and a Transmission Control Protocol (TCP) based pseudo NDD driver.

11. The computer program product of claim 8 wherein the TCP based interface utilizes a socket based kernel interface and provides a pseudo NDD layer support by implementing a TCPSOCK NDD framework interface.

12. The computer program product of claim 11 wherein the TCP based interface provides TCP based handlers selected from a group consisting of initialize, allocate, free, control, send and receive.

13. The computer program product of claim 12 wherein the TCP based interface utilizes a plurality of TCP/IPs socket based kernel interfaces.

14. The computer program product of claim 11 wherein the TCP based interface seamlessly operates with other non-TCP based Network Device Driver (NDD) interfaces.

* * * * *